United States Patent [19]

Bylander

[11] 3,986,185

[45] Oct. 12, 1976

[54] GAS DISCHARGE DISPLAY WITH CONTROL CELLS

[75] Inventor: Ernest G. Bylander, Grayson, Tex.

[73] Assignee: Texas Instruments, Dallas, Tex.

[22] Filed: Dec. 23, 1974

[21] Appl. No.: 535,779

[52] U.S. Cl. .......................... 340/324 M; 340/336; 340/343

[51] Int. Cl.² .......................................... G06F 3/14

[58] Field of Search .............. 340/324 M, 336, 343; 315/169 TV

[56] References Cited

UNITED STATES PATENTS

| | | | |
|---|---|---|---|
| 3,803,586 | 4/1974 | Johanns et al. | 340/324 M |
| 3,832,706 | 8/1974 | Reboul et al. | 340/324 M |
| 3,891,983 | 6/1975 | Lee | 340/336 |

*Primary Examiner*—Marshall M. Curtis
*Attorney, Agent, or Firm*—Harold Levine; Rene E. Grossman; Richard P. Berg

[57] ABSTRACT

A multiple character display device wherein a character is displayed by simultaneous excitation of common electrode along with selected ones of a plurality of segment electrodes. A gas discharge tube associated with each of the segment drives permits control of the display with voltages available on a conventional metal oxide semiconductor chip. In a preferred embodiment these gas discharge tubes are included as an integral part of the display tube itself.

17 Claims, 10 Drawing Figures

Fig. 2
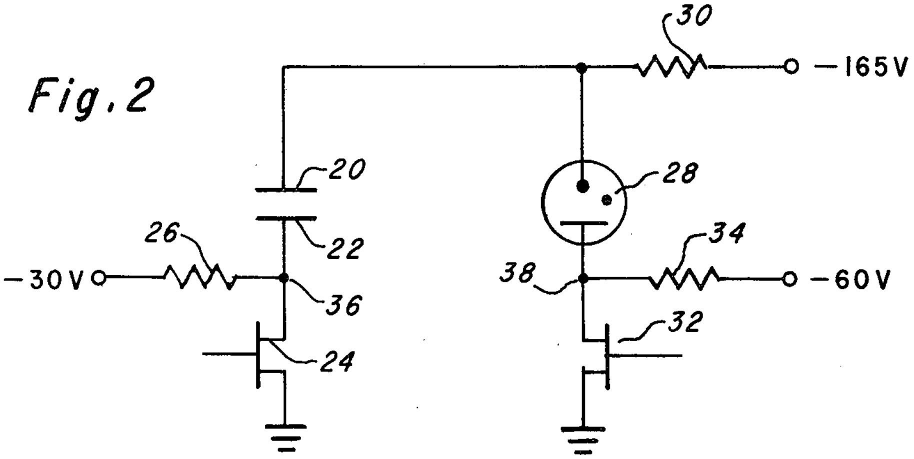
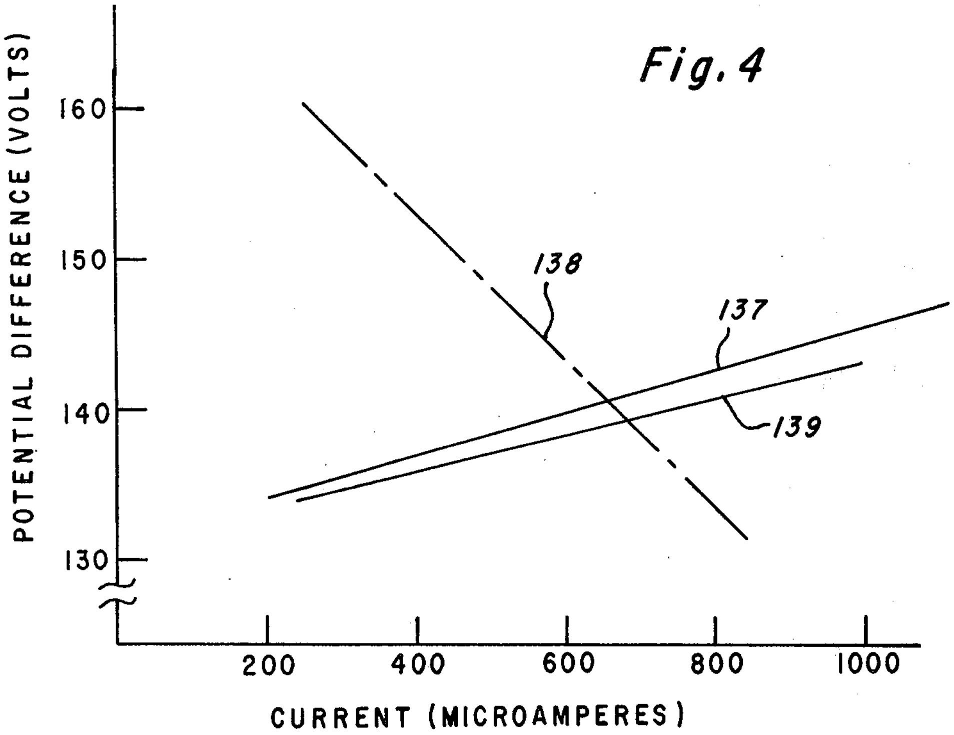

Fig. 5
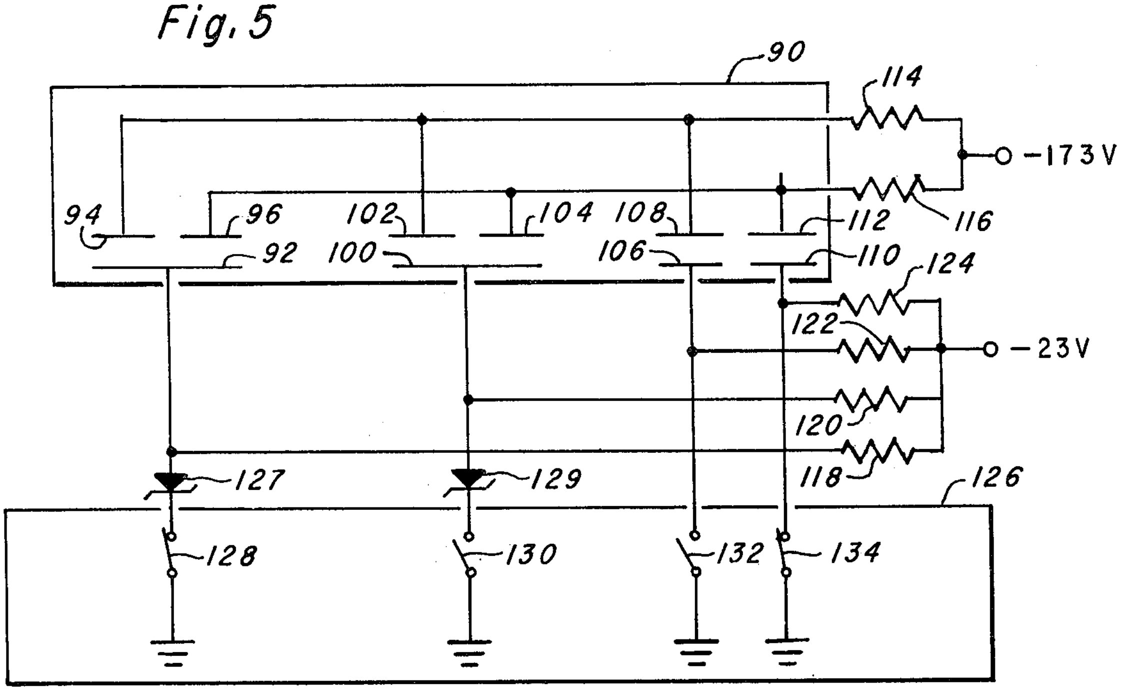
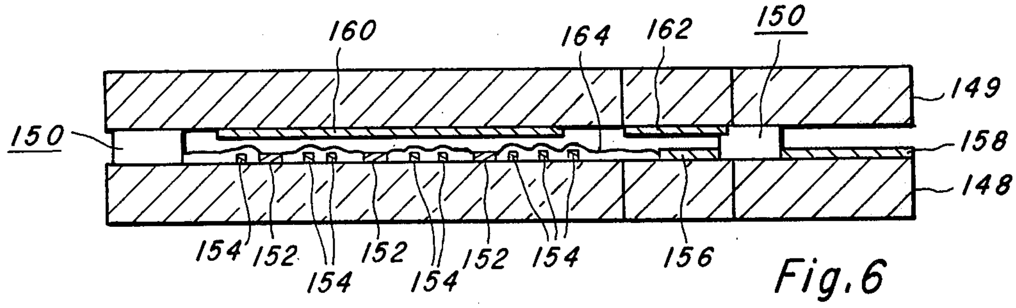
Fig. 6

GAS DISCHARGE DISPLAY WITH CONTROL CELLS

This invention relates to gas discharge display devices and in particular to display devices which include a set of character forming electrodes for each character to be displayed.

The use of gas discharge display devices wherein characters are displayed by the selective application of potentials across suitable electrodes is well known. One such display device is disclosed in U.S. Pat. No. 3,711,733, inventor, Robert R. Skutt.

Briefly, displays of this type comprise a substrate on which are located a plurality of electrodes for each character which is to be displayed. Typically, there are seven electrodes corresponding to each character and these may be arranged generally in the shape of a figure eight. A second transparent substrate is located above and slightly removed from the first substrate. A single transparent electrode for each charcter to be displayed is located on the underside of the second transparent substrate and generally overlays all of the corresponding character forming segments on the first substrate. The region between the two substrates is evacuated and filled with an ionizable gas. The application of suitable potentials to selected ones of the common electodes and segment forming electrodes results in the formation of gas plasmas in desired areas of the tube, thereby producing the desired visual display. As is well known in the art, the ionizing potentials may be either AC or DC.

The potential difference between a common electrode and a segment forming electrode requird to initiate or sustain ionization is a function of various tube design parameters. In a typical tube a DC potential difference of 155 volts may be required to initiate ionization and the plasma may be maintained down to a potential difference of 133 volts. In some applications for gas discharge display tubes such as electronic calculators, the logic signals which control the display are provided by a large-scale-integrated (LSI) semiconductor chip. The LSI chips cannot conveniently provide the relatively large potential differences required to initiate and sustain the plasma discharge in a display tube. This incompatability is resolved by electrically connecting driver networks between the LSI chip and either or both of the common and segment forming electrodes of the display tube. The incorporation of these typically semiconductor driver networks in a system adds both to the component cost and fabrication expense of the system.

In the practice of the invention, one of the electrodes, the common electrode in the preferred embodiment, is driven directly from the LSI chip. The opposite electrode, the segment forming electrode in the preferred embodiment, is driven by the LSI chip through an independent gas discharge tube. In the preferred embodiment of the invention this independent gas discharge tube is fabricated as an integral part of the display tube itself. In this way practice of the invention permits the display tube to be driven directly by the LSI chip and eliminates the need for intervening driver networks.

It will be seen, therefore, that an object of the invention is to provide a gas discharge display tube which can be driven directly by an LSI semiconductor chip.

It is another object of the invention to provide a method for driving a gas discharge display tube through a control gas discharge tube.

It is a further object of the invention to provide a gas discharge tube having the control gas discharge tube as an integral part thereof.

Other objects and features of the invention will become clear after a consideration of the following detailed description along with the accompanying drawings wherein:

FIG. 1 shows a typical electronic calculator.

FIGS. 1*a*,*b*, and *c* illustrate the display means in prior art calculators.

FIG. 2 is a schematic showing the general fueatures of the invention.

FIGS. 3*a* and *b* show the preferred embodiment of the display tube.

FIG. 4 shows volt-ampere characteristics for the display tube.

FIG. 5 is a schematic diagram illustrating two methods of employing the display tube.

FIG. 6 is a sectional view of an assembled display tube.

Figure 1:
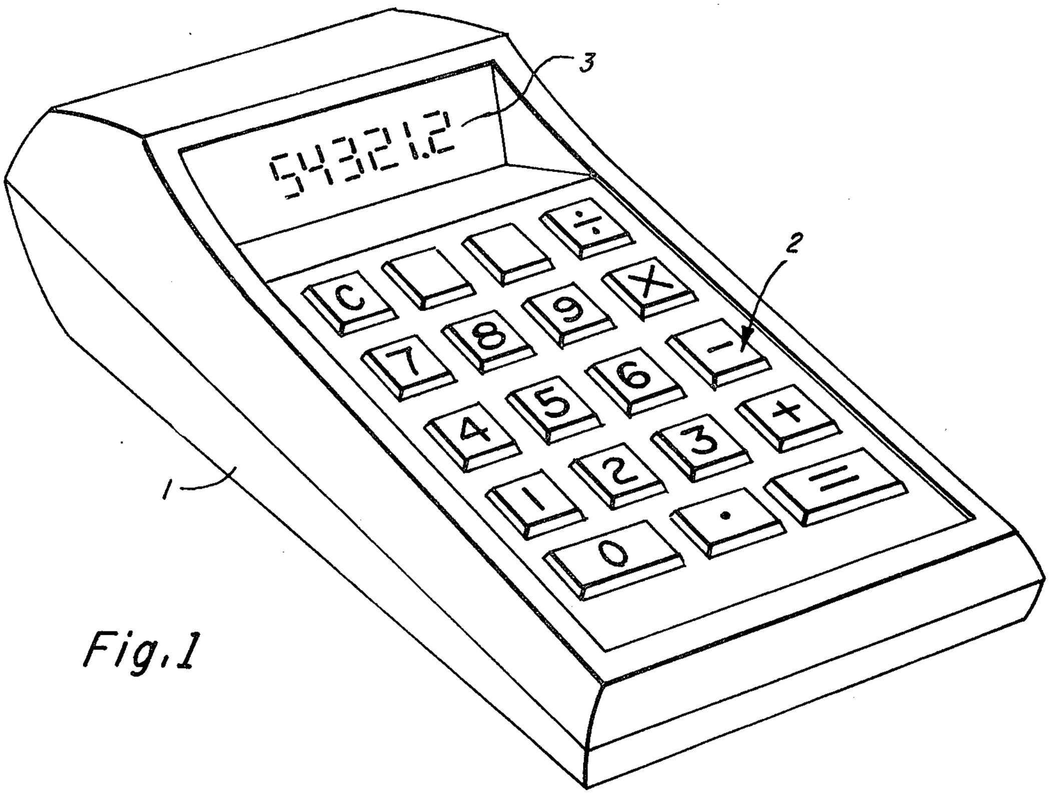

Referring to FIG. 1, a typical electronic calculator in which the invention finds utility is shown, comprising a housing 1 of molded plastic or the like, with a keyboard 2 and a display 3. The keyboard includes number keys 0–9, a decimal point key, and several standard operation keys such as +, −, =, ×, ÷, C (clear), etc. In other embodiments, the calculator system could perform a variety of additional functions, so keys such as $\sqrt{x}$, $^{x}\sqrt{y}$, $Y^x$, SIN, COS, TAN, LOG, etc., may be included in the keyboard 2. For simplicity of explanation, the display 3 is shown as having six digits of the seven segment type, with provision for decimal point, although it is understood that displays of eight, ten or twelve digits are standard. These may include exponents or scientific notation, and minus sign for both mantissa and exponent as well as commas. The display is a flat gas discharge panel as will be described. The calculator usually has a power supply in the form of an AC line, and a rectifier/voltge regulator, although batteries and a battery charger may be used.

Figure 1A:
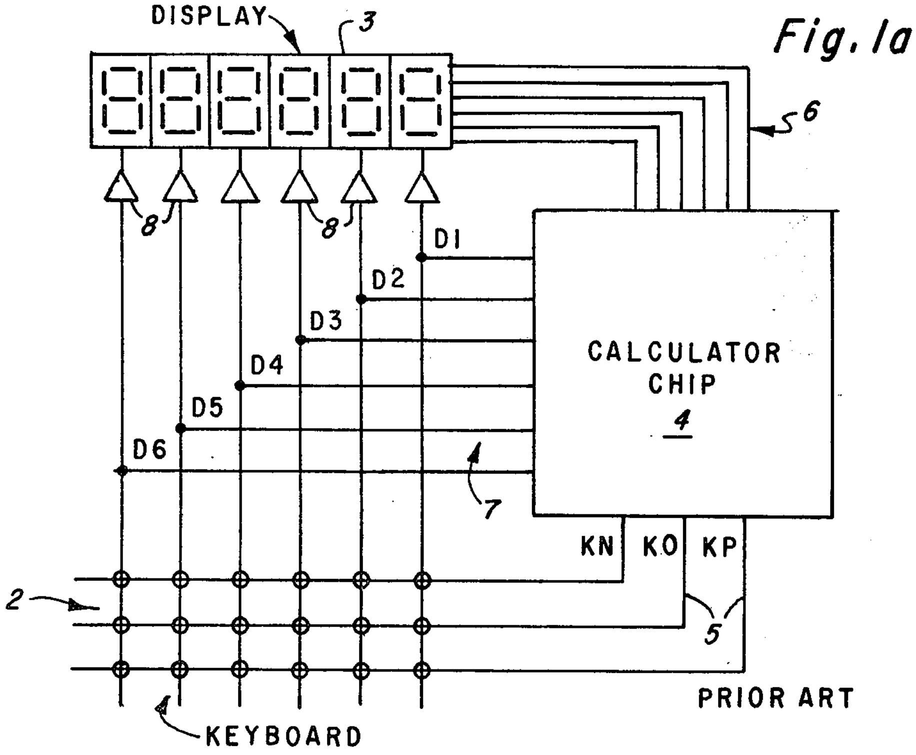
Figure 1B:
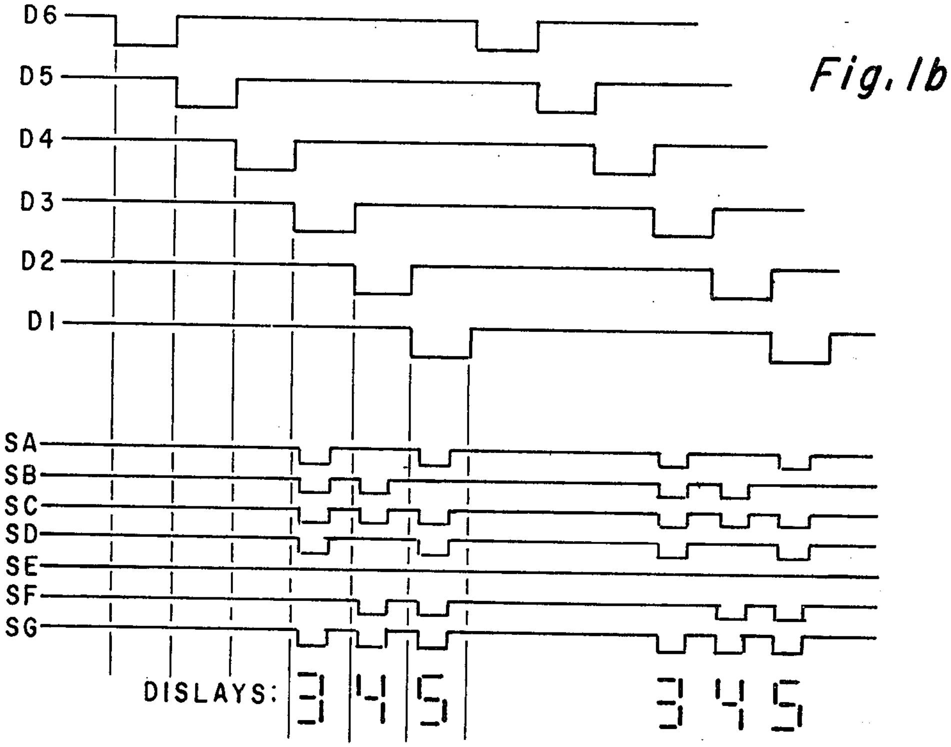
Figure 1C:
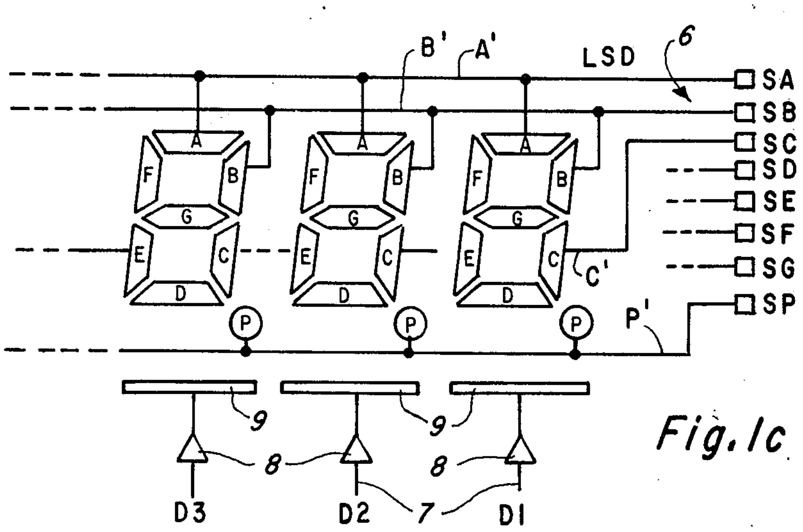

Essentially all of the electronic circuits of a calculator as in FIG. 1 are contained within a large-scale-integrated semiconductor chip which is typicaly packaged in a 28 pin plastic package and mounted on a printed circuit board within the housing 1. The general organization of a typical prior art calculator system is seen in block diagram in FIG. 1*a*, where the keyboard 2 and display 3 are interconnected with the semiconductor chip 4, employing display multiplexing and keyboard scanning in the manner set forth in U.S. Pat. application Ser. No. 420,999. Inputs to the chip are by three "K lines" 5 which are designated KN, KO, KP. Outputs from the chip include eight segment outputs SA to SP on lines 6 which are connected to common segments of the display 3. Typicaly, the segments are cathodes of a gas discharge panel. All like segments in each of the digits of the display are connected together as seen in FIG. 1*c*, so only eight segment outputs are needed. The digits or anodes of the display 3 are driven by output lines 7 which are labelled D1 to D6, with digit drivers 8 being used in the prior art to provide suitable voltage levels for a gas discharge display. Such devices would ordinarily operate at a threshold of about 155 volts. The lines D1 to D6 are also connected to the matrix of key switches which make up the keyboard 2. With six output lines D1 to D6, the matrix contains six times three or eighteen crosspoints so there are eighteen possible key positions, not all of which need be used. A minimum function calculator with only a [X], [÷], [+], [−], [=], [C], [.], [0–9]keyboard needs only seventeen keys so 17 of the crosspoint are used. Other input/output pins for the chip 4 include a voltge supply or Vdd pin, a ground or Vss pin, and an oscillator input or control $\phi$ for the on-chip oscillator.

A standard 28 pin integrated circuit package may be employed for a calculator having up to a 12 digit display when time multiplexing of the keyboard and display input/output is used in the manner set forth in application Ser. No. 420,999. To this end, the digit lines D1 to D6 of FIG. 1*a* are driven with sequential pulses as seen in FIG. 1*b*. The pulses would occur in the order of D6, D5, D4, D3, D2, D1, i.e., MSD to LSD, so that leading zero suppression may be implemented. The same pulses D6 to D1 are used to drive the vertical lines of the keyboard matrix 2, so the inputs KN, KO, KP to the chip 4 are time-encoded The segment outputs occur on digit at a time, in synchronization with the digit pulses D6 to D1, and these outputs are coded so that the proper segments light up for the desired digit to be displayed in each position. To display the number 345, the segments shown in FIG. 1*b* would be energized during D3, D2 and D1 as illustrated. During D6, D5 and D4, no segment pulses would occur due to leading zero suppression.

Referring to FIG. 1*c*, the display 2 is shown in schematic form. Only three digits are shown, it being understood that there could be any number such as eight, ten, or twelve. Each digit is made up of seven segments A to G plus a decimal point P. The outputs 6 from the chip are labeled SA to SP corresponding to the segments in the display. All of the A segments are connected together by a line A′, all B's are connected together by a line B′, all C's by a line C′, etc., and all decimal points P are connected together by a line P′. The segments A to P represent separate cathodes sharing a common anode in a display unit. The digit outputs D1 to D6 are separately connected to anodes 9, each of which is actually a transparent metal film covering all of the cathode segments in a digit. In the prior art, digit drivers 8 couple the D lines 7 to the anodes 9; these being transistor amplifiers to provide the proper voltage levels for actuating the display elements. All of the drivers 8 are usually contained in a pair of bipolar integrated circuit packages.

A general understanding of the operation of the invention may be had with reference to the schematic diagram of FIG. 2. A segment forming electrode 20 and common electrode 22 are part of one of the digits in a gas discharge display tube or more generally portions of a charcter in any other type of display. Common electrode 22 is coupled to one terminal of a field effect transistor (FET) 24. Common electrode 22 is also coupled to a −30 volt supply voltage through resistor 26. Segment forming electrode 20 is coupled to the cathode electrode of a VR105 voltage regulator tube 28. Segment forming electrode 20 is also coupled through ballast resistor 30 to a −165 volt supply voltage. The anode of voltage regulator tube 28 is coupled to one electrode of the second FET 32. The anode of voltge regulator tube 28 is also coupled through resistor 34 to a −60 volt supply.

Operationally, a glow discharge will be formed between the segment forming electrode 20 and the common electrode 22 only when the proper potentials are simultaneously applied to these two electrodes. If the gate potential of FET 24 is such as to turn this transistor off, junction point 36 will be allowed to float and will, in the absence of current flow in the display tube, be at −30 volts. Since the system of FIG. 2 the potential of segment forming electrode 20 cannot be more negative than −165 volts, the potential drop between segment forming electrode 20 and common electrode 22 will not exceed 135 volts. This potential drop is not sufficient to initiate a glow discharge. If the gate drive to FET 24, however, is such as to turn this transistor on, then junction point 36 will be held at ground potential. Under this condition common electrode 22 is said to be addressed since there now exists the possibility of a 165 volt drop across the display tube, this potential difference being sufficient to initiate a glow discharge. With FET 24 turned on so as to address common electrode 22 it next becomes necessary to consider the operation of that portion of the network which controls the potential applied to segment forming electrode 20.

If the potential applied to the gate of FET 32 is such as to turn this transistor off, then junction point 38 is allowed to float. Under these conditions the potential difference between the cathode and anode of voltage regulator tube 28 cannot exceed 105 volts, this being sufficient to initiate discharge in voltage regulator tube 28. Thus, with FET 24 turned on and FET 32 turned off, a 65 potential difference occurs across common electrode 22 and segment forming electrode 20 and a glow discharge will be maintained.

If, however, the gate potential of FET 32 turns this transistor on, then junction point 38 will be established at ground potential. Under these conditions the large potential difference across the electrodes of voltage regulator tube 28 will cause this tube to fire therby switching the voltage across its electrodes to 105 volts. This will cause the potential difference between the electrodes of the display tube to also drop to 105 volts, a value insufficient to sustain the glow discharge in the display tube.

By including a gas discharge voltage regulator tube 28 in the network of FIG. 2 it becomes possible to control the operation of the display tube with the FET outputs normally available on an LSI semiconductor chip. While the network of FIG. 2 is broadly illustrative of the operational principles of the invention, certain other advantages not yet discussed are provided by the preferred embodiment of the invention.

In the preferred embodiment voltage regulator tube 28 of FIG. 2 is replaced by a specially fabricated voltage regulator tube. Moreover, this specially fabricated voltage regulator tube or control diode is provided as an integral part of the display tube itself. Since the fabrication steps required to provide a display tube with the control diodes are only minimally increased over those required to produce a display tube without the control diodes, it is clear that in this way the control diode function is provided at a minimum cost. More importantly, it is generally desirable to match the operating characteristics of the control diode to those of the display tube itself. This matching is facilitated by including the control diodes within the structure of the display tube.

Figure 3A:
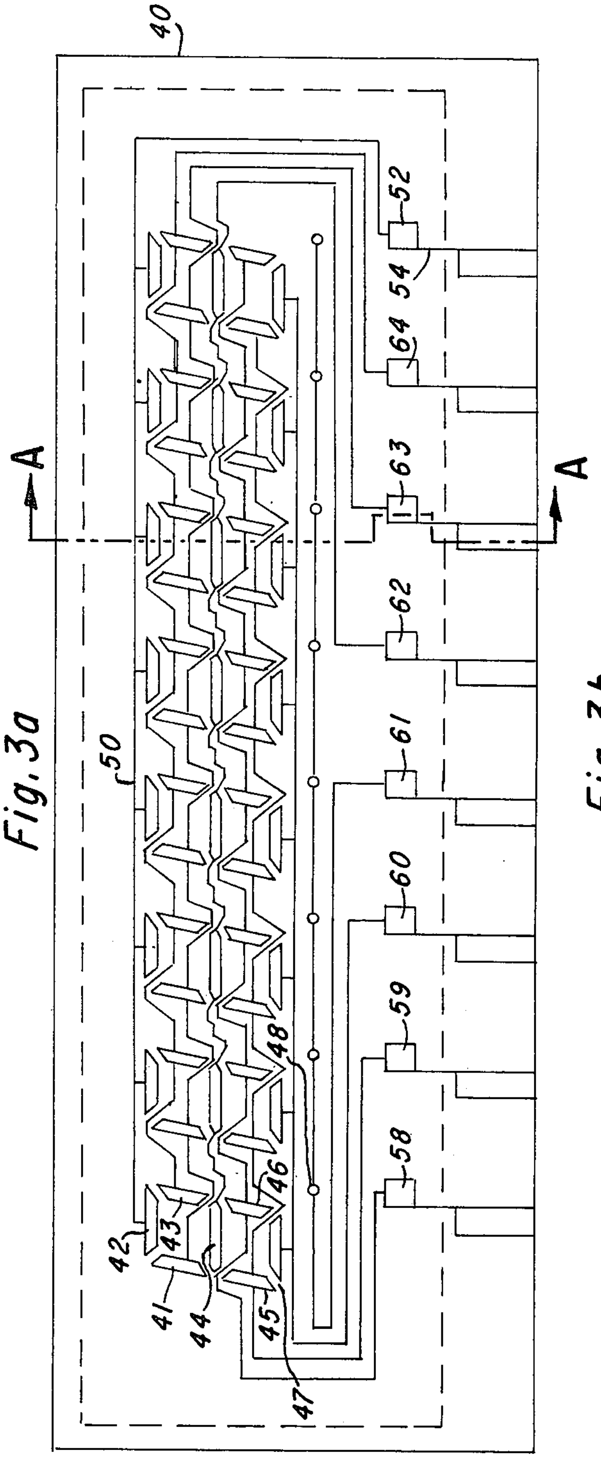
Figure 3B:
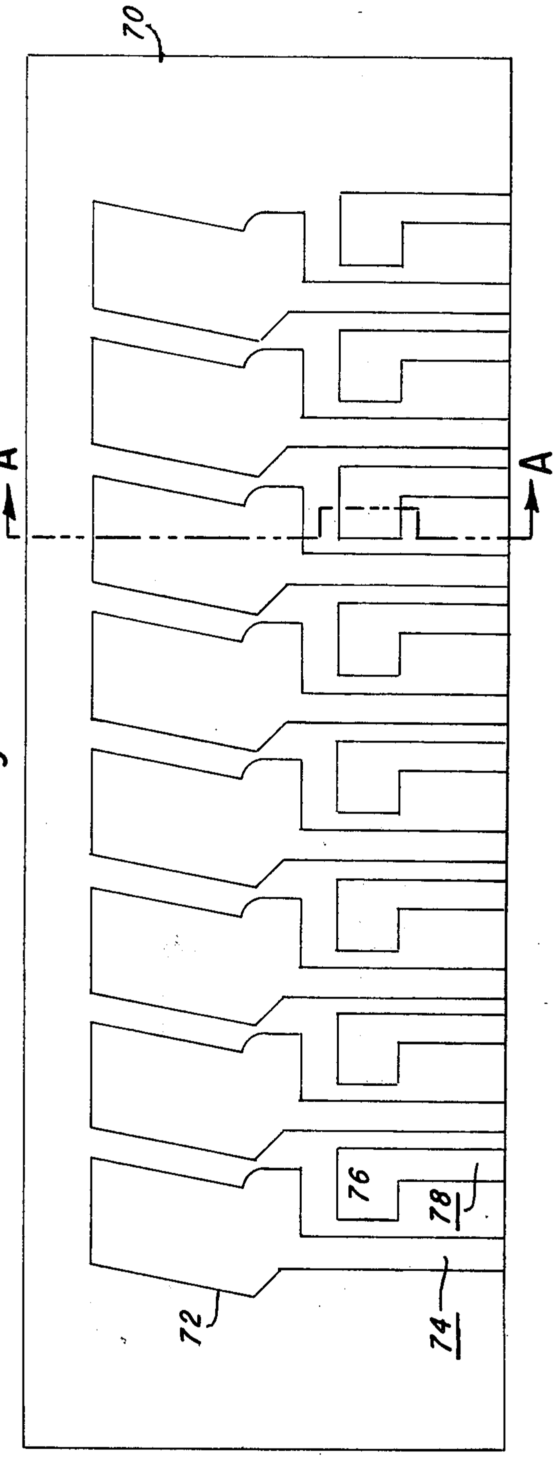

The structural characteristics of a display tube in accordance with the preferred embodiment of the invention are illustrated in FIGS. 3*a* and 3*b*. In FIG. 3*a* at 40 there is shown a support member which may be of a suitable substrate material such as ceramic or glass. At various points on substrate 40 there are located conducting segments which may be of a suitable material such as nickel or stainless steel. These conducting segments may be deposited or otherwise placed on the upper surface of substrate 40 by any one of a number of well known techniques. Seven of these conducting segments 41–47 are seen to be arranged generally in the form of a figure eight and comprise the segment forming electrodes for the first digit of the display. An eighth segment forming electrode 48 provides the decimal point for the first digit. Eight such digits are provided in the display tube of FIG. 3*a*. In the preferred embodiment of the invention similarly located segment forming electrodes in each of the digits are coupled by means of conductive material also placed on the surface of substrate 40. All of the topmost electrodes of the digit, for example, such as electrode 42 of the first digit, are electrically connected by means of conductive strip 50. The structure described up to this point is similar to that which is shown in the prior art.

In FIG. 3*a* it will be noted that conductive strip 50, which electriclly couples the topmost segment forming electrodes in each of the digits, is terminated at one end thereof in a conductive segment 52. Conductive segment 52 comprises the cathode of the control diode for the topmost segment forming electrodes of each of the digits. Control diode cathode 52 is coupled by means of conductive strip 54 to conductive segment 56 at which contact to external circuitry may be made. Conductive segments comprising the contrl diode cathodes for the other digit segments and for the decimal point are located at 58–64. Each of these control diode cathodes is electrically connected to the corresponding set of segment forming electrodes as well as to an external contact point. While not essential to the practice of the invention, it will be noted that all of the metalization applied to substrate 40 is located within the same plane and may be applied in a single deposition.

With the exception of those areas immediately overlying the segment forming electrodes, the decimal points, and the control diode cathodes, the entire surface of substrate 40 within dashed rectangle 66 is covered by a thin layer of generally dark colored insulating material. The insulator may be of a material such as a lead or barium glass and may be applied by the well known silk screening process.

That portion of the display tube illustrated in FIg. 3*b* is formed on a transparent substrate 70 of a material such as glass. Formed on the underside of substrate 70 are a plurality of electrically conductive electrodes such as that shown at 72. Electrode 72 is of a transparent material such as tin or indium oxide and may be placed on the underside of substrate 70 by deposition or other well known techniques.

In the assembled display tube substrate 70 is located above substrate 40 so that the corresponding edges of the two substrates coincide. A seal ring of a material such as a lead glass is screened onto the top surface of substrate 40 along dashed line 66. This seal ring prevents mechanical contact between substrates 40 and 70 and defines a sealed enclosure within dashed rectangle 66 and between the two substrates.

When substrate 70 is located above substrate 40 it will be seen that electrode 72 overlies segment forming electrodes 41–47 and decimal point electrode 48 of the first digit. Electrode 72 comprises the common electrode for the first digit and includes a conductive region to which external contact may be made at 74. Corresponding common electrodes are provided for each of the other digits of the display A second type of electrode 76 formed on the underside of substrate 70 is seen to overlie control diode cathode electrode 58 on substrate 40. Electrode 76 comprises the anode for the control diode of which electrode 58 is the cathode. External contact to anode 76 is made at conductive region 78. Similar anodes are provided for each of the other control diodes of the display. While not included as part of the preferred embodiment, pull down resistors for the common electrodes and control diode anodes, and ballast resistors for the segment forming electrodes may be screened onto substrates 40 and 70.

After the dipsplay tube has been assembled, the sealed volume between the two substrates is substantilly evacuated and filled with an ionizable gas such as neon or a neon-argon Penning mixture.

Each of the segment forming electrodes together with its corresponding common electrode and the gas located therebetween comprises a gas discharge cell. As is well known in the art, when a suitable potential difference is established between a segment forming electrode and its corresponding common electrode, the gas immediately above the segment forming electrode is ionized and glows in a manner which is visible through the transparent common electrode. The various control diodes, such as that comprising cathode 58, anode 76 and the gas located therebetween, also constitute gas discharge tubes. In the preferred embodiment, similarly oriented segment forming electrodes of all the digits are electrically connected to the cathode of the corresponding control diode and to an external contact point. The tube is also provided with an external contact for the common electrode of each digit and with an external contact for the anode electrode of each control diode.

Generally, it will be undesirable for an ionized control diode to be observable by a viewer. One means for visually blanking the control diodes is to make the control diode anode such as anode 76 of FIG. 3*b* of an opaque metal such as nickel. A second method is to paint the outside of glass substrate 70 with a dark paint in the region overlying the control diodes. Other methods of visual blanking may suggest themselves to those skilled in the art.

A more complete understanding of the structural details of the invention may be had with the aid of the sectional view of a complete tube as shown in FIG. 6. This view includes sections through the upperand lower substrates along line AA of FIGS. 3*a* and *b*. The lower glass or ceramic substrate is indicated by reference designator 148. Deposited at various points on substrate 48 is a metal layer so as to form segment forming electrodes 152, connecting strips 154, control diode cathode 156, and external contact means 158. The upper glass substrate is shown at reference designator 149. Deposited thereon is the transparent common electrode 160 for one of the digits and anode 162 for one of the control diodes. Seal ring 150 serves to mechanically separate the upper and lower substrates as well as to form a sealed enclosure in the area between the two substrates occupied by the digits. Within this enclosure those portions of lower substrate 148 not occupied by a segment forming electrode or a control diode cathode are covered by a generally dark covered insulating material 164.

One method for operating the display tube of the invention is illustrated in the schematic diagram of FIG. 5 and may be understood with the aid of the volt-ampere characteristics of FIG. 4. In FIG. 4 the ordinate represents the potential difference applied across the electrodes of a segment or control diode while the abscissa gives the corresponding current flowing in the device. Curve 137 of FIG. 4 is a typical volt-ampere characteristic for an ionized segment while curve 139 is a typical volt-ampere characteristic for an ionized control diode. In the preferred embodiment of the invention the cathodes of the control diodes such as cathode 52 of FIG. 3*a* have an area which is approximately 20% greater than the area of the corresponding segment forming electrode. As a result, the volt-ampere characteristic for the control diode as seen in FIG. 4 is displaced slightly from that of the corresponding segment. This permits more positive control of the segments by the control didoes.

In FIG. 5 a display tube of the type provided by the invention is shown in diagramatic form at 90 Tube 90 as shown is comprised of two digits each of which includes only two segment forming electrodes, it being understood that practical tubes will contain a greater number of digits each of which may typically include seven segments plus period and comma. The first digit is comprisd of common electrode 92 and segment forming electrodes 94 and 96. The second digit is comprised of common electrode 100 and segment forming electrodes 102 and 104. The control diode for segment forming electrodes 94 and 102 is comprised of anode 106 and cathode 108. The control diode for segment forming electrodes 96 and 104 is comprised of anode 110 and cathode 112. Control diode cathode 108 is connected internally of discharge tube 90 to its corresponding segment forming electrodes 94 and 102, the common point being coupled externally of tube 90 through ballast resistor 114 to a −173 volt DC supply. Similarly, control diode cathode 112 along with its corresponding segment forming electrodes 96 and 104 is connected through ballast resistor 116 to the −173 volt supply. Common electrodes 92 and 100 are coupled externally of tube 90 through resistors 118 and 120 respectively, to a −23 volt DC supply voltage. Control diode anodes 106 and 110 are coupled externally of tube 90 through resistors 122 and 124 respectively, to a negative DC supply voltage As shown in FIG. 5 this may be the same voltage as that supplied to the common electrodes of the digits. As mentioned previously, some or all of the pull-down resistors 118, 120, 122, and 124 and the ballast resistors 114 and 116 may be screened onto the substrates of tube 90 itself.

The LSI chip which controls the operation of display tube 90 is shown diagramaticaly at 126. Digit common electrode 92 is also coupled through eight volt zener diode 127 to one terminal of switch 128 on LSI chip 126 the other terminal of this switch beig coupled to a DC reference level which may conveniently be chosen as ground as shown in FIG. 5. Similarly, digit common electrode 100 is connected through eight volt zener diode 129 to one terminal of switch 130, the other terminal of this switch being connected to ground. Control diode anodes 106 and 110 are coupled to terminals of switches 132 and 143 respectively, the other terminals of these switches being connected to ground. In the LSI chip, switches 128, 130, 132 and 134 may typically comprise FET switches.

To illustrate a first method of employing the improved gas discharge tube it will be assumed that a display is to be provided by the left digit of tube 90 while the right digit is to remain off. To effect this condition switch 128 is closed whle switch 130 remains open. Further, it will be asssumed that the segment corresponding to segment forming electrode 94 is to be illuminated while the segment corresponding to segment forming electrode 96 is to be held off. This condition is realized with switch 132 open and switch 134 closed. It will be seen from the foregoing that in the practice of this first method of the invention, digits are addressed by closing the corresponding switches on the LSI chip while segments are held off by closing the corresponding switch of the LSI chip. It is important to note that in the practice of the first method of the invention, the enclosure of a digit address switch such as switch 128 and the closure of a segment switch such as segment 134 to hold off the corresponding segments occur simultaneously.

Prior to the formation of a character, when all control switches are open, any segment forming electrode and its corresponding common electrode are subjectd to a potential difference of 150 volts. This is less than the 155 volts typically required to initiate ionization. Accordingly, all segments are turned off. When switches 128 and 134 close simultaneously a 173 volt potential difference is applied across electrodes 110 and 112 of the right control diode while a 165 volt potential difference is applied across segment forming electrode 96 and common electrode 92. In both cases this potential difference is sufficient to initiate ionization of the corresponding region in tube 90. An important feature of the improved display tube provided by the invention is the fact that $\tau_{zr}$, the time for a segment or control diode to fire, is inversely proportional to the potential difference applied across the segment or control diode electrodes. Accordingly, it will be seen that the right control diode, being subjected to a 173 volt potential difference, will fire before the segment underlying segment forming electrode 96 which experiences a 165 volt potential difference. When the right control diode fires, its potential difference drops to that determined from load line 138 of FIG. 4. This load line corresponds to a net supply voltage difference of 173 volts and a ballast resistance of 50K ohms. The intersection of load line 138 with the volt-ampere characteristic of the control diode occurs at 139 volts. It will be seen that after the right control diode fires the potential on segment forming electrodes 96 and 104 will be 139 volts. At this time, the potential difference applied across segment forming electrode 96 and common electrode 92 of the left digit is 131 volts. This is not only less than the firing voltage for the segment but also less than the sustaining voltage for a segment which is typically 133 volts. Accordingly, even if the segment underlying segment forming electrode 96 has begun to fire upon closure of digit address switch 128, the firing of the right control diode would turn this segment off. After the right control diode fires the potential difference applied across segment forming electrode 104 and common electrode 100 of the nonaddressed digit is 116 volts, clearly insufficient to sustain ionization.

When switch 128 is closed the 165 volt potential difference applied across segment forming electrode 94 and common electrode 92 causes this segment to fire. The corresponding control diode, comprising electrodes 106 and 108, is subjected to a 150 volt potential difference which is insufficient to initiate ionization. Accordingly, the left control diode remains off and the segment underlying segment forming electrode 94 stays on until switch 128 is opened at the end of the digit display cycle. The segment underlying segment forming electrode 102, however, experiences only a 150 volt potential difference and does not fire.

From the foregoing it will be seen that by virtue of the voltage drop across the zener diodes in the control lines of addressed digit common electrodes, the potential difference across an addressed digit segment is less than that across an addressed control diode. Preferential firing of the control diode, therefore, is ensured even though the digit address and segment turnoff switches are closed simultaneously in the operation of the display tube. In this first method of utilizing the display tube of the invention, timing circuits which would cause the segment turnoff switches to close before closure of the digit address switches are not required.

An alternative method of employing the display tube may also be understood with reference to FIG. 5. In this case, however, it will be assumed that zener diodes 127 and 129 are removed from the circuit, in other words, digit common electrodes 92 and 100 are coupled directly to their respective address switches 128 and 130 on LSI chip 126. Also, in the alternative method the segment turnoff switches are closed prior to closure of the digit address switches by an amount of time sufficient to allow the control diodes to fire before the digits are addressed.

In this mode of operation again when all switches are open the 150 potential difference applied to the segments and control diodes is insufficient to initiate ionization. When switch 134 closes the 173 volt potential difference applied to the right control diode will cause this diode to ionize thereby establishing the voltage at cathode 112 as well as segment forming electrodes 96 and 104 at −139 volts as determined from load line 138 of FIG. 4. This results in a 116 volt potential difference across segment forming electrode 104 and common electrode 100 of the right digit, which is insufficient to fire this segment. Even when switch 128 closes to address the left digit the potential difference across segment forming electrode 96 and common electrode 92 will only be 139 volts, again insufficient to fire this segment. Since switch 132 remains open, however, so that the left control diode does not fire, the full 173 volt potential difference is applied across segment forming electrode 94 and common electrode 92 of the left digit when switch 128 closes. Accordingly, this segment is allowed to fire and remain on as long as switch 128 remains closed.

In this alternative method of utilizing the improved display tube the provision of zener diodes in the control lines to the digit common electrodes is not required. It is necessary, however, to provide timing circuits which will cause the segment turnoff switches to close prior to the digit address switches by a predetermined amount.

There has been disclosed an improved gas discharge display system wherein control diode gas discharges are employed to control the display. In the preferred embodiment of the invention these control diodes ae incorporated as an integral part of the display tube itself. Two alternative methods for operating the tube to effect a display have been described.

What is claimed is:

1. A gas discharge display system comprising:

a. a gas-filled tube;

b. at least one group of segmented display electrodes disposed in said tube and adapted to be operated in different combinations to display different characters;

c. at least one non-display electrode disposed in said tube adjacent to said at least one group and responsive to a potential difference for ionizing and causing a glow discharge in the gas located between said display electrodes and said at least one non-display electrode; and d. a plurality of gas discharge cell means each electrically interconnected to selected display electrodes for inhibiting the excitation of the gas located between said selected display electrodes and said at least one non-display electrode whenever the associated interconnected gas discharge cell is in a conducting state.

2. The system of claim 1 wherein said potential difference is a DC potential difference.

3. The system of claim 1 wherein said gas discharge cell is an integral part of said tube.

4. A gas discharge display system comprising:

a. a tube including a plurality of pairs of electrodes, b. a gas in the region between each of said pairs of electrodes and capable of supporting a glow discharge when the potential differene across a pair of electrodes exceeds a predetermined ionization potential, c. a first logic signal means for controlling the DC voltage of a first electrode of each of said pairs, a second logic signal means for controlling the DC voltage of the second electrode of each of said pairs, and d. excitation means including a gas discharge cell responsive to one of said logic signal means for establishing a potential difference between at least one of said pairs of electrodes in excess of said ionization potential when said gas discharge cell is in a non-conducting mode and a potential difference between at least one of said pairs of electrodes being less than said ionization potential when said gas discharge cell is in a conducting mode.

5. The system of claim 4 wherein said gas discharge cell is an integral part of said tube.

6. The system of claim 4 wherein one electrode of said gas discharge cell is electrically coupled to one electrode of said at least one of said pairs of electrodes, and the other electrode of said gas discharge cell is electrically coupled to the output of one of said logic signal means.

7. In a display system which includes a gas discharge tube for producing a display of at least one character and wherein the portion of said tube for the display of a character comprises an array of segment forming electrodes, a common electrode, and a gas in the region between said array and said common electrode, the combination which comprises with said gas discharge tube:

a. first logic signal means for controlling the potential of said common electrode associated with said at least one character, b. second logic signal means for controlling the potential of at least one of said segment forming electrodes, c. a gas discharge cell means with at least one first electrode coupled to the output of said second logic signal means and at least one second electrode connected to said at least one of said segment forming electrodes for inhibiting ionization of the gas adjacent to said at least one of said segment forming electrodes whenever said gas discharge cell is in a conducting mode, and d. a ballast resistor electrically coupling the connection between said second electrode and said at least one of said segment forming electrodes to a DC reference voltage.

8. The combination of claim 7 wherein said gas discharge tube includes means for displaying a plurality of characters, the array of segment forming electrodes for one of said plurality of characters being identical to that for at least one other of said characters.

9. The combination of claim 8 wherein for a set of at least two characters having identical arrays of segment forming electrodes, corresponding segment forming electrodes from each character of the set are electrically connected.

10. The combination of claim 9 wherein said gas discharge cell means is an integral part of said gas discharge tube.

11. The system of claim 1 wherein said at least one group comprises a plurality of groups and wherein said at least one non-display electrode comprises a plurality of non-display electrodes.

12. The system of claim 11, further including a first logic means for addressing at least one of said plurality of non-display electrodes and a second logic means for addressing at least one of said plurality of gas discharge cell means.

13. The system of claim 12 wherein said plurality of gas discharge cell means comprises a plurality of gas discharge cells, a first electrode of each cell being electrically connected to like-positioned display electrodes in said plurality of groups and a second electrode of each cell being electrically connected to said second logic means.

14. The method of operating a gas discharge display tube wherein said tube contains an ionizable gas, a plurality of character display elements, each of said elements having a common electrode and a plurality of character-forming segmented electrodes correspondingly disposed in each one of said elements, corresponding segmented electrodes in said elements being individually connected into groups, and a plurality of gas discharge cells each having a first and second electrode, each said first electrode being connected to a different one of said groups, said method comprising:

a. electrically coupling the first electrode of each of said cells individually through a separate ballast resistor to a first DC reference potential, b. at the beginning of a display cycle coupling the common electrode of each character element to be displayed during the cycle to a second DC reference potential which differs from said first DC reference potential by at least the typical ionization potential of one of said segmented electrodes and a common electrode, and c. at the beginning of each display cycle coupling said second electrode of each of the gas discharge cells, corresponding to segmented electrodes which are not to have an ionization potential applied, to a third DC reference potential, the algebraic difference between said first and third reference potentials exceeding that between said first and second reference potentials.

15. The method of claim 14 wherein each of said gas discharge cells is an integral part of said display tube.

16. The method of operating a gas discharge display tube wherein said tube contains an ionizable gas, a plurality of character display elements, each of said elements having a common electrode and a plurality of character-forming segmented electrodes correspondingly disposed in each one of said elements, corresponding segmented electrodes in said elements being individually connected into groups, and a plurality of gas discharge cells each having a first and second electrode, each said first electrode being connected to a different one of said groups, said method comprising:

a. electrically coupling the first electrode of each of said cells individually through a separate ballast resistor to a first DC reference potential, b. at the beginning of each display cycle coupling said second electrode of each of the gas discharge cells, corresponding to segmented electrodes which are not to have an ionization potential applied, to a second DC reference potential, which differs from said first DC reference potential by at least the typical ionization potential of one of said cells, causing conduction by each of said gas discharge cells corresponding to segmented electrodes which are not to have an ionization potential applied, and c. at a predetermined interval after the beginning of a display cycle coupling the common electrode of each character element to be displayed during the cycle to said second Dc reference potential.

17. The method of claim 16 wherein each of said gas discharge cells is an integral part of said display tube.

* * * * *